United States Patent
Kascatan Nebioglu et al.

(10) Patent No.: US 9,394,436 B2
(45) Date of Patent: Jul. 19, 2016

(54) FORM IN-PLACE GASKET WITH TACK FREE SURFACE

(71) Applicants: Aysegul Kascatan Nebioglu, Winsted, CT (US); Marufur Rahim, Avon, CT (US)

(72) Inventors: Aysegul Kascatan Nebioglu, Winsted, CT (US); Marufur Rahim, Avon, CT (US)

(73) Assignee: DYMAX CORPORATION, Torrington, CT (US)

( * ) Notice: Subject to any disclaimer, the term of this patent is extended or adjusted under 35 U.S.C. 154(b) by 0 days.

(21) Appl. No.: 14/010,228

(22) Filed: Aug. 26, 2013

(65) Prior Publication Data

US 2015/0056455 A1 Feb. 26, 2015

(51) Int. Cl.
C08L 33/14 (2006.01)
B32B 27/40 (2006.01)
F16J 15/14 (2006.01)
C08G 18/48 (2006.01)
C08G 18/67 (2006.01)
C09D 175/16 (2006.01)

(52) U.S. Cl.
CPC ............... C08L 33/14 (2013.01); B32B 27/40 (2013.01); C08G 18/4854 (2013.01); C08G 18/672 (2013.01); C09D 175/16 (2013.01); F16J 15/14 (2013.01); Y10T 428/31551 (2015.04)

(58) Field of Classification Search
CPC .... C08L 33/14; C09D 175/16; C08G 18/672; C08G 18/4854; C08G 18/48; B32B 27/40; Y10T 428/31551
USPC .................................... 428/423.1; 522/33, 18
See application file for complete search history.

(56) References Cited

U.S. PATENT DOCUMENTS

| | | | |
|---|---|---|---|
| 5,945,463 A * | 8/1999 | Kawabuchi et al. | 522/96 |
| 6,346,330 B1 | 2/2002 | Huang et al. | |
| 6,448,302 B1 | 9/2002 | Dawson et al. | |
| 6,670,017 B2 | 12/2003 | Huang et al. | |
| 6,787,225 B2 | 9/2004 | Dawson et al. | |
| 6,829,362 B1 * | 12/2004 | Kadziela et al. | 381/312 |
| 7,955,696 B2 * | 6/2011 | Baikerikar et al. | 428/328 |
| 8,400,730 B2 | 3/2013 | Uranaka et al. | |
| 8,508,927 B2 | 8/2013 | Chen | |
| 2002/0127407 A1 | 9/2002 | Huang et al. | |
| 2008/0128955 A1 | 6/2008 | Lim et al. | |

(Continued)

FOREIGN PATENT DOCUMENTS

| EP | 2479040 A1 | 7/2012 |
|---|---|---|
| JP | 2003700611 | 4/2003 |

(Continued)

OTHER PUBLICATIONS

Corresponding European Search Report EP14181351.
Corresponding European Written Opinion EP1418351.

*Primary Examiner* — Thao T Tran
(74) *Attorney, Agent, or Firm* — Roberts & Roberts, LLP

(57) ABSTRACT

A method of preparing a flexible, substantially tack free gasket by forming a liquid composition which is a radiation polymerizable admixture of a free radical polymerizable urethane(meth)acrylate monomer, free radical polymerizable urethane(meth)acrylate oligomer, or combinations thereof; a free radical polymerizable diluent; a free radical polymerization photoinitiator; a wax; a thixotropic agent; and optionally an adhesion promoter and a colorant. The composition is distributed onto a substrate and then exposed to actinic radiation to cure the liquid composition into a flexible, substantially tack free gasket having a Shore A hardness of from about A20 to about A80.

20 Claims, 1 Drawing Sheet

(56) References Cited

U.S. PATENT DOCUMENTS

2010/0212824 A1 8/2010 Lionberger et al.
2010/0214732 A1* 8/2010 Charles et al. ........... 361/679.33
2012/0041096 A1* 2/2012 Kurata et al. ................. 522/180

FOREIGN PATENT DOCUMENTS

| JP | 2011046774 | 3/2011 |
| WO | WO 03/021138 | 3/2003 |
| WO | WO 2007/001937 | 1/2007 |

* cited by examiner

FORM IN-PLACE GASKET WITH TACK FREE SURFACE

BACKGROUND OF THE INVENTION

1. Field of the Invention

The present invention relates to gaskets, and more particularly to gaskets which are formed in-place on a substrate and cure to a have a substantially tack-free surface. Such find use in the production of electronic devices, such as housings for glass, plastic and metal enclosures.

2. Description of the Related Art

There is great commercial interest in preparing devices such as electronic devices which have sealable housing layers enclosing electronic circuits. Often such housing layers sandwich a peripheral gasket for preventing entry of contaminants into the device housing. Typical electronic devices include hand held cell phones, pagers, global positioning systems, personal digital assistants, and the like. These enclose delicate displays, electronic circuits, and similar components, that can be easily damaged during everyday use. Indeed, electronic circuits within the device can be rendered inoperable if debris such as dust particles, enter the device through gaps between adjacent housing layers. Therefore, such electronic devices typically include one or more gaskets or seals between some adjacent components, such as the device housing and the display assembly. These gaskets transfer impact forces to more rugged support frames within the device and away from delicate components, and the same gaskets inhibit debris from entering the device which that could damage electronic circuits. Unfortunately, these gaskets, due to their tight positioning between housing layers, typically make device assembly relatively difficult as it can be difficult to press a panel into a gasket that extends around the perimeter of another panel because of the small clearances between the two panels. If care is not taken during this step, one panel could flatten part of the gasket instead of properly connecting to it, thereby partially rendering the gasket ineffective for preventing debris from entering. Other methods for connecting a gasket to a panel, such as co-molding, typically fail because of different material properties of the two components. In particular, some panels cannot tolerate the high temperatures used in co-molding operations. U.S. Pat. No. 8,508,927 shows one form of a gasket for assembling an electronic mobile device, however, this disclosure employs a preformed gasket which engages a device panel, a spacer and an outer panel. U.S. Pat. No. 6,346,330 describes a low outgassing UV-cationic formulation which can be used in form in-place gasket materials for electronic devices. International patent publication WO2007/001937 shows a UV-free radical curing form in-place gasket formulation utilizing alkyl(meth) acrylate polymers. U.S. Pat. Nos. 6,787,225 and 6,448,302 show a radiation curable coating which employs a wax, however, gaskets are not contemplated. U.S. Pat. No. 8,400,730 shows multistage gaskets using multiple material types, however, these provide a thick seal.

The present invention solves these problems by first forming and attaching a liquid radiation polymerizable, gasket forming composition onto a substrate, and then curing the liquid composition into a flexible, substantially tack free gasket. Since the gasket is formed in-situ, it adheres onto the first substrate, and is cured to a substantially non-tacky state by radiation polymerization rather than by high temperatures which the electronic device components cannot tolerate. Then a second substrate is removably, non-adhesively positioned onto the first substrate with the gasket between the two substrates. Since the gasket has a substantially non-tacky surface, the second substrate can easily be detached from the first substrate for access to the in-between electric circuits for repairs.

SUMMARY OF THE INVENTION

The invention provides a method of preparing a flexible, substantially tack free gasket which comprises:
I) forming a liquid composition which comprises a radiation polymerizable admixture of
a) from about 20 wt % to about 85 wt. % of a free radical polymerizable urethane acrylate monomer, free radical polymerizable urethane methacrylate monomer, free radical polymerizable urethane acrylate oligomer, free radical polymerizable urethane methacrylate oligomer or combinations thereof;
b) from about 5 wt % to about 70 wt. % of a free radical polymerizable diluent;
c) from about 1 wt % to about 6 wt. % of a free radical polymerization photoinitiator;
d) from about 4 wt % to about 30 wt. % of a wax;
e) from about 2 wt % to about 10 wt. % of a thixotropic agent;
f) about 0 wt % to about 10 wt. % of an adhesion promoter; and
g) about 0 wt % to about 1 wt. % of a colorant;
II) distributing the liquid composition onto a substrate; and then
III) exposing the liquid composition to sufficient actinic radiation to thereby cure the liquid composition into a flexible, substantially tack free gasket having a Shore A hardness of from about A20 to about A80.

The invention also provides liquid composition for forming a flexible, substantially tack free gasket which comprises a radiation polymerizable admixture of
a) from about 20 wt % to about 85 wt. % of a free radical polymerizable urethane acrylate monomer, free radical polymerizable urethane methacrylate monomer, free radical polymerizable urethane acrylate oligomer, free radical polymerizable urethane methacrylate oligomer or combinations thereof;
b) from about 5 wt % to about 70 wt. % of a free radical polymerizable diluent;
c) from about 1 wt % to about 6 wt. % of a free radical polymerization photoinitiator;
d) from about 4 wt % to about 30 wt. % of a wax;
e) from about 2 wt % to about 10 wt. % of a thixotropic agent;
f) about 0 wt % to about 10 wt. % of an adhesion promoter; and
g) about 0 wt % to about 1 wt. % of a colorant.

DESCRIPTION OF THE INVENTION

Figure 1:
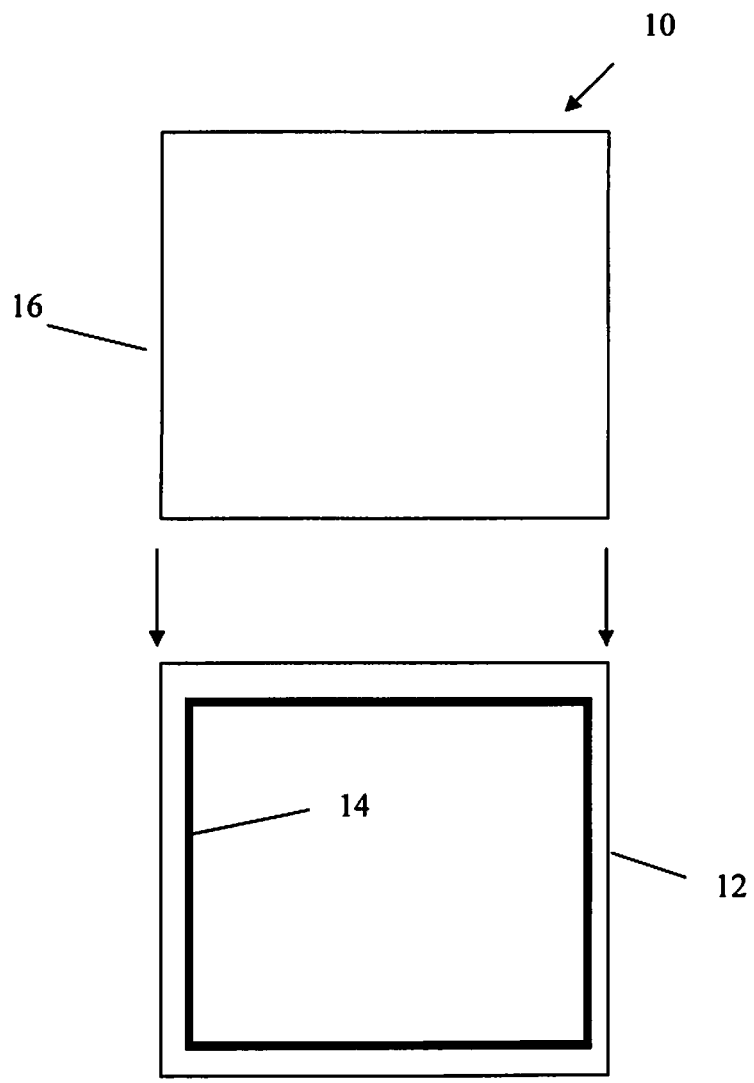
FIG. 1 illustrates an article produced according to the invention including first and second substrates mating with an intermediate substantially tack free gasket.

A first step for preparing a flexible, substantially tack free gasket is to form a liquid composition which comprises a radiation polymerizable admixture of
a) from about 20 wt % to about 85 wt. % of a free radical polymerizable urethane acrylate monomer, free radical polymerizable urethane methacrylate monomer, free radical polymerizable urethane acrylate oligomer, free radical polymerizable urethane methacrylate oligomer or combinations thereof;

b) from about 5 wt % to about 70 wt. % of a free radical polymerizable diluent;
c) from about 1 wt % to about 6 wt. % of a free radical polymerization photoinitiator;
d) from about 4 wt % to about 30 wt. % of a wax;
e) from about 2 wt % to about 10 wt. % of a thixotropic agent;
f) about 0 wt % to about 10 wt. % of an adhesion promoter; and
g) about 0 wt % to about 1 wt. % of a colorant.

For purposes of this invention, the term a substantially tack free gasket shall be defined as a gasket which is substantially not sticky to the touch, and substantially non-adherent to an adjacent surface when an adjacent surface is touching the gasket, and wherein the gasket and adjacent surface can be separated without damage to the gasket or adjacent surface.

Non-exclusive examples of useful free radical polymerizable urethane acrylate or methacrylate monomers and free radical polymerizable urethane acrylate or methacrylate oligomers are a tetramethylene glycol urethane acrylate oligomer, and a propylene glycol urethane acrylate oligomer. Others are urethane acrylate or urethane methacrylate oligomers based upon polyethers or polyesters, which are reacted with aromatic, aliphatic, or cycloaliphatic diisocyanates and capped with hydroxy acrylates. Examples of oligomers non-exclusively include difunctional urethane acrylate oligomers such as a polyester of hexanedioic acid and diethylene glycol, terminated with isophorone diisocyanate, capped with 2-hydroxyethyl acrylate (CAS 72121-94-9); a polypropylene glycol terminated with tolyene-2,6-diisocyanate, capped with 2-hydroxyethylacrylate (CAS 37302-70-8); a polyester of hexanedioic acid and diethylene glycol, terminated with 4,4'-methylenebis(cyclohexyl isocyanate), capped with 2-hydroxyethyl acrylate (CAS 69011-33-2); a polyester of hexanedioic acid, 1,2-ethanediol, and 1,2 propanediol, terminated with tolylene-2,4-diisocyanate, capped with 2-hydroxyethyl acrylate (CAS 69011-31-0); a polyester of hexanedioic acid, 1,2-ethanediol, and 1,2 propanediol, terminated with 4,4'-methylenebis(cyclohexyl isocyanate, capped with 2-hydroxyethyl acrylate (CAS 69011-32-1); a polyester of hexanedioic acid, diethylene glycol, terminated with isophorone diisocyanate, capped with 2-hydroxyethyl acrylate (CAS 72121-94-9); a polytetramethylene glycol ether terminated with 4,4'-methylenebis(cyclohexylisocyanate), capped with 2-hydroxyethyl acrylate; and a hydroxy terminated polybutadiene terminated with isophorone diisocyanate, capped with 2-hydroxyethyl acrylate; Also useful are monofunctional urethane acrylate oligomers, such as a polypropylene terminated with 4,4'-methylenebis(cyclohexylisocyanate), capped with 2-hydroxyethyl acrylate and 1-dodosanol. They also include difunctional urethane methacrylate oligomers such as a polytetramethylene glycol ether terminated with tolylene-2,4-diisocyanate, capped with 2-hydroxyethyl methacrylate; a polytetramethylene glycol ether terminated with isophorone diisocyanate, capped with 2-hydroxyethyl methacrylate); a polytetramethylene glycol ether terminated with 4,4'-methylenebis(cyclohexylisocyanate), capped with 2-hydroxyethyl methacrylate; and a polypropylene glycol terminated with tolylene-2,4-diisocyanate, capped with 2-hydroxyethyl methacrylate. In one embodiment, such are present in the liquid composition in an amount of from about 20 wt % to about 85 wt. %, preferably from about 30 wt % to about 80 wt. %, and more preferably from about 40 wt % to about 70 wt. % based on the weight of the liquid composition.

Non-exclusive examples of useful free radical polymerizable diluents are alkyl acrylates and alkyl methacrylates like isobornyl(meth)acrylate, isodecyl(meth)acrylate, lauryl (meth)acrylate, cyclic trimethylolpropane formal acrylate, octyldecyl acrylate, tetrahydrofurfuryl(meth)acrylate, tridecyl(meth)acrylate. Other useful but not limited to free radical polymerizable diluents are 2-hydroxyethyl(meth)acrylate, phenoxyethyl(meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris(2-hydroxy ethyl) isocyanurate triacrylate, and combinations thereof. In one embodiment, such are present in the liquid composition in an amount of from about 5 wt % to about 70 wt. %, preferably from about 15 wt % to about 60 wt. %, and more preferably from about 25 wt % to about 50 wt. % based on the weight of the liquid composition.

Non-exclusive examples of useful free radical polymerization photoinitiators themselves photolytically generate free radicals by a fragmentation. Suitable initiators include aromatic ketones. Preferred examples thereof include benzophenone, benzoin, acetoin, acyloin, diketone, xanthone, thioxanthone, and ketocoumarin derivatives. Specific examples include benzophenone (CAS 119-61-9); polymeric benzophenone, Michler's ketone (CAS 90-94-1); benzoin methyl ether (CAS 3524-62-7); benzoin ethyl ether (CAS 574-09-4); 2-hydroxy-2-methylpropiophenone (CAS 7473-98-5); 1-hydroxycyclohexyl phenyl ketone (CAS 947-19-3); 2-Hydroxy-2-methyl-1-[4-(1-methylvinyl)phenyl]propanone homopolymer (CAS 115055-18-0), 2,2-diethoxyacetophenone (CAS 6175-45-7); camphorquinone (CAS 10373-78-1); 2-ethylanthraquinone (CAS 84-51-5); 2-tert-butylanthraquinone (CAS 84-47-9; 2,3-dichloro-1,4-naphthoquinone (CAS 117-80-6) 2-hydroxy-4'-(2-hydroxyethoxy)-2-methylpropiophenone (CAS 106797-53-9); methyl benzoylformate (CAS 15206-55-0); 2,2-dimethoxy-2-phenylacetophenone (CAS 24650-42-8); 2-ethylhexy-4-(dimethylamino)benzoate (CAS 21245-02-3); 2-ethyl-4-(dimethylamino)benzoate (CAS 10287-53-3); 2-isopropylthioxanthone (CAS 5495-84-1); 4-phenylbenzophenone (CAS 2128-93-0); and 2-benzyl-2-(dimethylamino)-4'-morpholinobutyrophenone (CAS 119313-12-1). In addition, suitable photoinitiators include phosphine oxides, such as diphenyl(2,4,6-trimethylbenzoyl)phosphine oxide (CAS 75980-60-8); and phenylbis(2,4,6-trimethylbenzoyl)phosphine oxide (CAS 162881-26-7), and combinations thereof.

The free radical free radical polymerization photoinitiator is preferably present in an amount sufficient to effect polymerization of the polymerizable compound upon exposure to sufficient actinic radiation, especially in the visible and/or ultraviolet region of the electromagnetic spectrum. In one embodiment, such are present in the liquid composition in an amount of from about 1 wt % to about 6 wt. %, preferably from about 1.5 wt % to about 5 wt. %, and more preferably from about 2 wt % to about 4 wt. % based on the weight of the liquid composition.

Non-exclusive examples of useful waxes are polyethylene waxes, polyamide waxes, Teflon waxes, Carnauba waxes, polypropylene waxes and combinations thereof. In one embodiment, such waxes have a melting point of about 50° C. or higher. In another embodiment, such waxes have a melting point of about 100° C. or higher. In one embodiment, such are present in the liquid composition in an amount of from about 4 wt % to about 30 wt. %, preferably from about 8 wt % to about 25 wt. %, and more preferably from about 10 wt % to about 20 wt. % based on the weight of the liquid composition.

Non-exclusive examples of useful thixotropic agents are include clays such as bentonite, silicates such as sodium silicate, magnesium silicate, fluorine silicate, lithium silicate, silicon dioxide, fumed silicon dioxide (silica), (meth)acrylate functionalized fumed silica, titanates, mineral pigments, polyacrylamide, cellulose acetate propionate (CAP), cellulose acetate butyrate (CAB), acrylamide functionalized CAB and combinations thereof. In one embodiment, such are present in the liquid composition in an amount of from about 2 wt % to about 10 wt. %, preferably from about 2.5 wt % to about 8 wt. %, and more preferably from about 3 wt % to about 5 wt. % based on the weight of the liquid composition.

Optionally included in the liquid composition is an adhesion promoter. Non-exclusive examples of useful adhesion promoters are gamma-methacryloxypropyltrimethoxy silane, beta (3,4 epoxycyclohexyl)ethyltrimethoxy silane, gamma-glycidoxypropyl trimethoxysilane, gamma-glycidoxypropyl triethoxysilane, vinyl trimethoxysilane, vinyl triethoxysilane, (meth)acrylic phosphonic acid esters, (meth)acrylic phosphate acid esters, (meth)acrylic acid, β-carboxyethyl acrylate, and other carboxylic acid functional acrylate esters, and combinations thereof. In one embodiment, such are present in the liquid composition in an amount of from about 0 wt % to about 10 wt. %, preferably from about 0 wt % to about 5 wt. %, and more preferably from about 0 wt % to about 3 wt. % based on the weight of the liquid composition.

Optionally included in the liquid composition is a colorant such as a pigment or dye. Useable dyes include the azo dyes which predominate the yellow, orange, brown and red hues. The violet dyes may come from any of the azo, anthraquinone, xanthene or triarylmethane group containing compounds. Blue and green dyes are predominantly of the anthraquinone and triarylmethane groups although it is also possible to use dyes selected from the azine, thiazine and phthalocyanine groups. Black hued dyes include azine dyes although other azo dyes can be used. Other useful dyes include FEW Chemicals S 0845 having CAS 886046-46-4. The tosylated version of this dye is available as PSA7000 from H. W. Sands and S 2293 from FEW Chemicals. The tosylated version of this dye and with methyl pendant groups instead of butyl groups is S 2295 from FEW Chemicals. NK4286 has CAS 1115209-44-3. It is also available as S 2294 from FEW Chemicals. The tosylated version of this dye is a preferred colorant. The colorant dye can be CAS 886046-46-4, which is commercially available from St-Jean Photochemie as CYD-1006 and from H. W. Sands as PSA1201 which has iodide as its counter ion and an absorption maximum at 587 nm. A similar colorant dye is NK4286 which has pentyl pendant groups instead of butyl pendant groups. Another colorant dye can be CAS 189189-12-6, which is commercially available from H. W. Sands as PSA1373. It is the same as CAS 886046-46-4 except that its counter ion is perchlorate. It has an absorption maximum at 587 nm. Another preferred colorant dye is similar to CAS 886046-46-4 but with the counter ion replaced by 4-methyl benzene sulfonate. Another colorant dye may be CAS 1325-86-6, such as Oil Blue 613, which is a nonionic compound. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP111-S (Paul Uhlich); Brilliant Green Toner GR 0991 (Paul Uhlich); Lithol Scarlet D3700 (BASF); Solvent Red 49; Pigment red 57:1; Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Solvent Blue 808; Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA or Irgalite Blue NGA (Ciba-Geigy); Paliogen Blue 6470 (BASF); Sudan II (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Solvent Yellow 162; Paliogen Yellow 152, 1560 (BASF); Lithol Fast Yellow 0991 K (BASF); Paliotol Yellow 1840 (BASF); Novopern Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hansa bril yellow SGX 03(B); Hostaperm Pink E; Fanal Pink D4830 (BASF); Cinquasia Magenta (Du Pont); Paliogen Black L0084 (BASF); Pigment Black K801 (BASF); and carbon blacks such as REGAL 330 RTM (Cabot), Carbon Black 5250, Carbon Black 5750 (Columbia Chemical), Carbon Black 9B1 (Penn Color) and the like. Examples of suitable dyes also include Pontomine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Uquid Special 110, available from Sandoz, Inc.; D&C Yellow #10 (Acid Yellow 3), available from Tricon; Yellow Shade 16948, available from Tricon; Basocid Black.times.34, available from BASF; Carta Black 2GT, available from Sandoz, Inc.; Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrozol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF) and combinations thereof. For this invention the term pigment includes a conductive powder such as a metal powder of iron, silver, copper aluminum or their alloys, a metal oxide powder, a metal carbide powder, a metal boride powder, carbon black, graphite or combinations thereof. In one embodiment, such colorants are present in the liquid composition in an amount of from about 0 wt % to about 1 wt. %, preferably from about 0 wt % to about 0.5 wt. %, and more preferably from about 0 wt % to about 0.2 wt. % based on the weight of the liquid composition.

The liquid composition may be prepared by admixing the composition components until a substantially homogenous fluid is formed. In one use, the liquid composition is formed and then exposed to sufficient actinic radiation to initiate the polymerization of the polymerizable urethane acrylate monomer or oligomer component. Polymerization may be initiated by exposure to ultraviolet and/or visible light.

The length of time for exposure is easily determined by those skilled in the art and depends on the selection of the particular components of the radiation curable composition. Typically exposure ranges from about 0.2 second to about 120 seconds, preferably from about 0.5 seconds to about 60 seconds, and more preferably from about 0.5 seconds to about 30 seconds. Typical exposure intensities range from about 5 mW/cm$^2$ to about 2500 mW/cm$^2$, preferably from about 50 mW/cm$^2$ to about 1500 mW/cm$^2$, and more preferably from about 100 mW/cm$^2$ to about 1000 mW/cm$^2$.

In use, the liquid composition is distributed onto a substrate; and then exposed to sufficient actinic radiation to thereby cure the liquid composition into a flexible, substantially tack free gasket having a Shore A hardness of from about A20 to about A80, preferably from about A25 to about A70, and more preferably from about A30 to about A60. Shore A Durometer hardness is measured according to ASTM D2240.

Gaskets produced according to the inventions may be tested according to compression set ASTM D395 B in order to measure their ability to retain elastic properties. Compression shows the permanent deformation remaining after release of a compressive stress. Compression set is taken as the percentage of the original deflection after the material is allowed to recover at room temperature for 30 minutes. Usually gaskets have compression set from about 5% to about 50%, preferably from about 5% to 40%, and more preferably from about 5% to 30%.

Gaskets produced according to the inventions may be tested according to ASTM D638 for tensile properties. Usually gaskets have the tensile strength of from about 50 psi to about 800 psi and elongation of from about 20% to about 400%. Usually, the gaskets have 2 hour boiling water absorption according to ASTM D570 of about 3% or less, more usually about 1% to about 3%. Usually, the gaskets have 24 hour water absorption at 25° C. according to ASTM D570 of about 3% or less, more usually from about 1% to about 3%. Usually, the gaskets have a linear shrinkage according to ASTM D2566 of about 2% or less, more usually from about 0.5% to about 2%.

FIG. 1 shows an illustration of an article produced according to the invention. An enclosure housing 10 comprises a first substrate 12, a flexible, substantially tack free gasket 14 attached around the periphery of the first substrate 12. A second substrate 16 removably and non-adhesively positioned on the first substrate with the flexible, substantially tack free gasket 14 between the first substrate 12 and the second substrate 16 by juxtaposing them in the direction of the arrows. Gasket 14 is adhered to first substrate 12 either by an adhesive, or by the adhesive nature of the liquid composition before curing. After curing the liquid composition, it forms the gasket according to the invention, which is flexible, and substantially tack free so that it does not adhere to second substrate 16. The article may be held together by any desired device, such as screws, clips, or the like. Thus, when it is desired to service the article, the screws or clips are removed, and the second substrate 16 is easily removable from the gasket and the first substrate 12.

The following non-limiting examples serve to illustrate the invention. Table 1 and Table 2 illustrate formulations with two different polyether urethane acrylate oligomers and properties according to the present invention and their comparisons. The liquid composition formulations are prepared, distributed onto a substrate, and then exposed to sufficient actinic radiation to thereby cure the liquid composition into the form of a gasket.

TABLE 1

| | Examples | | | | | |
|---|---|---|---|---|---|---|
| | Example 1 | Example 2 | Example 3 | Example 4 | Example 5 | Example 6 |
| Urethane Acrylate Oligomer #1[1] | 28 | 25 | 14.5 | 14 | 14 | 29 |
| Urethane Acrylate Oligomer #2[2] | 11 | 11 | 26.9 | 25 | 26 | 10.9 |
| Alkyl Acrylate Diluent | 15 | 11 | 9.1 | 9 | 9 | 12 |
| Acrylamide Diluent | 4.5 | 8 | 8.1 | 8 | 8 | 6.5 |
| 1% Pigment in Acrylamide Diluent | — | — | — | 0.8 | — | 1.9 |
| Urethane Acrylate Monomer | 26 | 24 | 25.9 | 24 | 25 | 23 |
| Daracur MBF | 2.7 | 2.6 | 2.7 | 2.6 | 2.7 | 2.7 |
| Irgacure 819 | — | — | — | — | — | 0.5 |
| Fumed Silica | 3.7 | 3.4 | 3.7 | 3.3 | 3.3 | 3.8 |
| Adhesion promoter | — | — | — | — | — | 4.8 |
| Polypropylene Wax | 9.1 | 15 | 9.1 | 13.3 | 12 | 4.9 |

[1]Polytetramethylene glycol based polyurethane acrylate with functionality of 2
[2]Polypropylene glycol based polyurethane acrylate with functionality less than 2

TABLE 2

| | Properties of Examples | | | | | |
|---|---|---|---|---|---|---|
| | Example 1 | Example 2 | Example 3 | Example 4 | Example 5 | Example 6 |
| Shore A Hardness | 38 | 46 | 28 | 31 | 38 | 55 |
| Compression Set | 18% | 16% | 21% | 29% | 26% | 15% |
| Tackiness[3] | DT | DT | DT | DT | DT | DT |

[3]DT: Dry to touch (tack-free)
Curing condition: 300 mW/cm$^2$, Dymax UVCS conveyor equipped with 5000-EC, metal-halide lamp.

The characteristics for a tack free surface may be based on ASTM method C679-03. The test is conducted by placing polyethylene film on top of the cured material and put 30 g of weight and waiting time is 30 sec. No material was transferred to the polyethylene film for the above examples when it is peeled. This is an indicator of a tack free surface. This ASTM method is used for determining the tack free time for sealants, meaning a long cure is needed before it is tack free. In these examples, testing is right after cure as tack free time is not important for this invention. The method is used to show that the product is tack free.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method of preparing a flexible, substantially tack free gasket which comprises:
   I) forming a liquid composition which comprises a radiation polymerizable admixture of
   a) a component consisting essentially of from about 20 wt % to about 85 wt. % of at least one or more of a free radical polymerizable urethane acrylate monomer and a free radical polymerizable urethane methacrylate monomer, in combination with at least one or more of a free radical polymerizable tetramethylene glycol urethane acrylate oligomer and a free radical polymerizable propylene glycol urethane methacrylate oligomer;
   b) from about 5 wt % to about 70 wt. % of a free radical polymerizable diluent;
   c) from about 1 wt % to about 6 wt. % of a free radical polymerization photoinitiator;
   d) from about 4 wt % to about 30 wt. % of a wax;
   e) from about 2 wt % to about 10 wt. % of a thixotropic agent;
   f) about 0 wt % to about 10 wt. % of an adhesion promoter; and
   g) about 0 wt % to about 1 wt. % of a colorant;
   II) distributing the liquid composition onto a substrate; and then
   III) exposing the liquid composition to actinic radiation such that components (a) and (b) thereby form a polymerization product consisting essentially of polymerized components (a) and (b), and to form a cured liquid composition into a flexible, substantially tack free gasket having a Shore A hardness of from about A20 to about A80.

2. The method of claim 1 wherein component a) includes both one or more of a tetramethylene glycol urethane acrylate oligomer, and a propylene glycol urethane acrylate oligomer.

3. The method of claim 1 wherein the free radical polymerizable diluent comprises one or more of alkyl acrylates and alkyl methacrylates.

4. The method of claim 1 wherein the free radical polymerization photoinitiator comprises one or more aromatic ketones.

5. The method of claim 1 wherein the wax has a melting point of about 50° C. or above.

6. The method of claim 1 wherein the wax comprises one or more of a polyethylene wax, polyamide wax, Teflon wax, Carnauba wax, polypropylene wax.

7. The method of claim 1 wherein the thixotropic agent comprises one or more of a clay, a silicate, a titanate, a mineral pigment, polyacrylamide, cellulose acetate propionate, cellulose acetate butyrate, acrylamide functionalized cellulose acetate butyrate.

8. The method of claim 1 wherein the adhesion promoter is present in the liquid composition.

9. The method of claim 1 wherein the colorant is present in the liquid composition.

10. The method of claim 1 wherein the substantially tack free gasket has a Shore A hardness of from about A30 to about A60.

11. The method of claim 1 wherein the liquid composition comprises:
   a) a component consisting essentially of from about 30 wt % to about 80 wt. % of at least one or more of a free radical polymerizable urethane acrylate monomer and a free radical polymerizable urethane methacrylate monomer, in combination with at least one or more of a free radical polymerizable tetramethylene glycol urethane acrylate oligomer, and a free radical polymerizable propylene glycol urethane methacrylate oligomer;
   b) from about 15 wt % to about 60 wt. % of a free radical polymerizable diluent;
   c) from about 1.5 wt % to about 5 wt. % of a free radical polymerization photoinitiator;
   d) from about 8 wt % to about 25 wt. % of a wax;
   e) from about 2.5 wt % to about 8 wt. % of a thixotropic agent;
   f) about 0 wt % to about 5 wt. % of an adhesion promoter; and
   g) about 0 wt % to about 0.5 wt. % of a colorant.

12. The method of claim 1 wherein the liquid composition comprises:
   a) a component consisting essentially of from about 40 wt % to about 70 wt. % of at least one or more of a free radical polymerizable urethane acrylate monomer and a free radical polymerizable urethane methacrylate monomer, in combination with at least one or more of a free radical polymerizable tetramethylene glycol urethane acrylate oligomer and a free radical polymerizable propylene glycol urethane methacrylate oligomer;
   b) from about 25 wt % to about 50 wt. % of a free radical polymerizable diluent;
   c) from about 2 wt % to about 4 wt. % of a free radical polymerization photoinitiator;
   d) from about 10 wt % to about 20 wt. % of a wax;
   e) from about 3 wt % to about 5 wt. % of a thixotropic agent;
   f) about 0 wt % to about 3 wt. % of an adhesion promoter; and
   g) about 0 wt % to about 0.2 wt. % of a colorant.

13. A liquid composition for forming a flexible, substantially tack free gasket which comprises a radiation polymerizable admixture of
   a) a component consisting essentially of from about 20 wt % to about 85 wt. % of at least one free radical polymerizable monomer selected from free radical polymerizable urethane acrylate monomers and free radical polymerizable urethane methacrylate monomers in combination with one or more of a tetramethylene glycol urethane acrylate oligomer, and a propylene glycol urethane acrylate oligomer;
   b) from about 5 wt % to about 70 wt. % of a free radical polymerizable diluent;
   c) from about 1 wt % to about 6 wt. % of a free radical polymerization photoinitiator;
   d) from about 4 wt % to about 30 wt. % of a wax;
   e) from about 2 wt % to about 10 wt. % of a thixotropic agent;
   f) about 0 wt % to about 10 wt. % of an adhesion promoter; and
   g) about 0 wt % to about 1 wt. % of a colorant;
   wherein upon exposing the liquid composition to actinic radiation
   such that components (a) and (b) thereby form a polymerization product consisting essentially of polymerized components (a) and (b) and to form a cured liquid composition into a flexible, substantially tack free gasket having a Shore A hardness of from about A20 to about A80.

14. The liquid composition of claim 13 which comprises both a tetramethylene glycol urethane acrylate oligomer, and a propylene glycol urethane acrylate oligomer.

15. The liquid composition of claim 13 wherein the free radical polymerizable diluent comprises one or more of alkyl acrylates and alkyl methacrylates.

16. The liquid composition of claim 13 wherein the free radical polymerization photoinitiator comprises one or more aromatic ketones.

17. The liquid composition of claim 13 wherein the wax has a melting point of about 50° C. or above.

18. The liquid composition of claim 13 wherein the wax comprises one or more of a polyethylene wax, polyamide wax, Teflon wax, Carnauba wax, polypropylene wax.

19. A substantially tack free gasket which comprises the liquid composition of claim 13 which has been subjected to sufficient actinic radiation to thereby cure the liquid composition into a flexible, substantially tack free gasket having a Shore A hardness of from about A20 to about A80.

20. An article which comprises a first substrate, the flexible, substantially tack free gasket of claim 19 attached to the first substrate, and a second substrate removably and non-adhesively positioned on the first substrate with the flexible, substantially tack free gasket between the first substrate and the second substrate.

* * * * *